US008954514B2

(12) United States Patent
Gunasekara

(10) Patent No.: US 8,954,514 B2
(45) Date of Patent: Feb. 10, 2015

(54) SYSTEM AND METHOD FOR DISPLAYING TIME-SENSITIVE ALERTS IN A MOBILE DEVICE

(75) Inventor: Don Gunasekara, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 313 days.

(21) Appl. No.: 12/644,792

(22) Filed: Dec. 22, 2009

(65) Prior Publication Data

US 2011/0153754 A1 Jun. 23, 2011

(51) Int. Cl.
*G06F 15/16* (2006.01)

(52) U.S. Cl.
CPC .................................... *G01L 13/043* (2013.01)
USPC ......................... 709/206; 455/404.1; 715/808

(58) Field of Classification Search
USPC ................................ 709/206; 455/404.1, 403
See application file for complete search history.

(56) References Cited

U.S. PATENT DOCUMENTS 7,209,916 B1 * 4/2007 Seshadri et al. ...................... 1/1
2004/0133646 A1 * 7/2004 Leukert-Knapp et al. ..... 709/206
2006/0133340 A1 * 6/2006 Rybak et al. .................. 370/338
2007/0118608 A1 * 5/2007 Egli ............................. 709/217
2007/0192734 A1 * 8/2007 Berstis et al. ................. 715/808
2008/0046524 A1 * 2/2008 Jerding et al. ................ 709/206
2008/0243853 A1 * 10/2008 Reding et al. ..................... 707/9
2008/0268910 A1 * 10/2008 Park ............................. 455/566
2009/0099732 A1 * 4/2009 Pisz ................................ 701/45
2009/0204905 A1 * 8/2009 Toghia .......................... 715/753
2009/0213844 A1 * 8/2009 Hughston ..................... 370/352
2009/0248516 A1 * 10/2009 Gross .............................. 705/14
2010/0106500 A1 * 4/2010 McKee et al. ................ 704/235
2010/0318615 A1 * 12/2010 Griffin .......................... 709/206
2011/0045802 A1 * 2/2011 Bland et al. ................ 455/412.1
2011/0117886 A1 * 5/2011 Travis et al. ............... 455/412.2

FOREIGN PATENT DOCUMENTS

KR 2008/0038725 * 5/2008 .............. G10L 13/00

OTHER PUBLICATIONS

U.S. Appl. No. 61/161,949 Specification and Drawing Figures.*
http://searchsoa.techtarget.com/definition/user-interface.*
http://www.techterms.com/definition/user_interface.*

* cited by examiner

*Primary Examiner* — Kostas Katsikis

(57) ABSTRACT

In various embodiments, a system and a method for receiving alerts through a network includes providing a device which may include a user interface, a pop-up management module and a display. Further, a communications interface between the device and one or more database systems located outside the network may be provided. Using the user interface, a user is allowed to selectively choose to display, on the display, one or more message types generated by the one or more database systems. The message types may be received via the network, processed and displayed on the display by the pop-up management module as a pop-up message. The device may be a WiMAX-enabled device and the network may be a WiMAX network.

28 Claims, 9 Drawing Sheets

SYSTEM AND METHOD FOR DISPLAYING TIME-SENSITIVE ALERTS IN A MOBILE DEVICE

BACKGROUND

This disclosure is generally related to wireless communications technologies. Further, this disclosure is related to Wireless Metropolitan Area Network (WMAN) technologies under IEEE Standard 802.16 and, in particular, is directed to Worldwide Interoperability for Microwave Access ("WiMAX") technologies under IEEE Standard 802.16e. In one or more embodiments, this disclosure is directed to a system and method useful for displaying time sensitive alerts in a WiMAX handset or other device. More particularly, this disclosure is directed to a system and method for receiving real-time alerts device with user-selected display options on a WiMAX mobile device.

Conventionally, various types of alerts and notifications are made available through the World Wide Web (WWW), through email list servers ("listserves"), and/or through short messaging service (SMS) messages. Such alerts and notifications may include, for example, crime reports, Amber alerts (i.e., missing or abducted person alerts), Presidential alerts, weather alerts, Homeland Security alerts, fire department notifications, city/country traffic alerts, seismic and tsunami alerts, and financial alerts, etc.

An RSS feed (most commonly translated as "Really Simple Syndication" but sometimes "Rich Site Summary") is a family of web feed formats used to publish frequently updated works such as blog entries, news headlines, audio, and video in a standardized format, e.g., XML, a generic specification for the creation of data formats. An RSS document (which is called a "feed", "web feed", or "channel") includes full or summarized text, plus metadata such as publishing dates and authorship. Web feeds allow readers who want to subscribe to timely updates from favored websites or to aggregate feeds from many sites into one place. RSS feeds can be read using software called an "RSS reader", "feed reader", or "aggregator", which can be an application program that is web-based, desktop-based, or mobile-device-based. Standardized XML file format allows the information to be published once and viewed by many different programs. The user subscribes to a feed by entering into the reader the feed's URL or by clicking an RSS icon in a web browser that initiates the subscription process. The RSS reader checks the user's subscribed feeds regularly for new items, downloads any updates that it finds, and provides a user interface to monitor and read the feeds.

Such conventional approaches typically include using a message or program icon sitting on the screen of the user's device, e.g., a handheld "smartphone" or other mobile device or handset, and require the running of an application program on the mobile device. Viewing of such messages conventionally requires that an application program interface (API) be enabled on the mobile device, and that limited memory and processor resources must be allocated in the mobile device to store and process such messages, while running a particular type of program, e.g., a web browser or e-mail program.

What is needed is a system and method that reduces or eliminates the conventional requirement for allocation of limited memory and processing resources in a mobile device in connection with the display of time-sensitive alerts and news items. What is even further needed is system and method that reduces or eliminates the conventional requirement for allocation of limited memory and processing resources in a mobile device and which makes efficient use of limited bandwidth (i.e., reduces the "overhead" traffic over the network) associated with the display of time-sensitive alerts or other messages/information in a mobile communications system.

SUMMARY

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16 (WMAN), 802.16e (WiMAX), 3GPP, 3GPP2, etc. communication standard specifications. However, this disclosure is not necessarily limited to use with such systems and methods.

This disclosure introduces a novel way to report/display various types of news and other alerts or "real-time" messages as a pop up message in accordance with user preferences set in their mobile device/handset. Alerts are received in real-time or near real-time in accordance with preferred choices and are displayed in a novel way on the mobile device screen, instead of using conventional pre-set icons on the screen and programs that must be executed to display information. In this context, "real-time" may be construed to mean computer systems that update information at essentially the same rate as they receive information. Various embodiments of this disclosure utilize so-called pop-up messages that may be pushed over the network by a network application in accordance with user preferences which may include preferences and registrations stored at a network base station. By way of non-limiting definition, a popup window is a window that is smaller than standard windows and without some features such as tool bars or status bars. Popup windows (or "popups") are popular for small sidebar-style pages that are digressions from the main page on a display. Such "pop-ups" may be implemented by the use of various software programming techniques, e.g., by html programming and/or JavaScript programming.

In one or more embodiments, this disclosure is useful to display, for example, the following types of alerts in a "pop-up" format: crime reports, so-called "Amber Alerts" or missing/exploited children alert, a Presidential alert, weather alerts, security alerts (e.g., provided by the Department of Homeland Security), fire departments, traffic alerts, municipal government alerts, seismic alerts or alerts on other types of natural disasters, and financial alerts. This novel approach contrasts with conventional alerts which are based on email and SMS type of messages, or RSS feeds. Other types of information may also be displayed on a user's handset or mobile device when "pushed" across the network In one embodiment, a method of receiving alerts through a communications network includes providing a mobile device registered in the network, said mobile device comprising a pop-up management module and a display; providing a communications interface between the mobile device and one or more database systems located outside the network; providing a user interface in the mobile device configured to allow the user to selectively choose to display, on the display, one or more message types generated by the one or more database systems, wherein a message of said one or more message types are pushed over the network from a network server and received by the mobile device, wherein said received message is processed by said pop-up management module and displayed on the display as a pop-up message.

In another embodiment, a system for providing alerts to a user through a data network includes a mobile device registered in the network, said mobile device comprising a processor, a memory device, a transceiver configured to selectively transmit and receive data over the network, a user interface, and a display, wherein the processor is configured to control a pop-up management module; a communications interface between the mobile device and one or more database systems located outside the network; wherein the user interface is configured to allow the user to selectively choose to display, on the display, one or more message types generated by the one or more database systems, wherein said one or more message types are received by said pop-up management module via the network and displayed on the display as a pop-up message.

In another embodiment, a computer-readable medium comprising computer readable code embodied thereon which, when executed by a processor arranged in a WiMAX-enabled device comprising a display, a pop-up management module, and a user interface, causes the processor to carry out the functions of receiving one or more alert message types over a communications interface between the WiMAX-enabled device and one or more database systems located outside the WiMAX network; allowing the user to selectively configure display characteristics for each of the one or more message types received from the one or more database systems; processing one or more messages from the one or more database systems in the pop-up management module; and displaying said one or more messages processed by said pop-up management module on the display as a pop-up message.

In various embodiments of this disclosure, the mobile device may be a WiMAX-enabled device, and the network may be a WiMAX network. Further, the user interface may be used to configure the handheld or mobile device to control the manner or schedule by which various alerts are displayed as pop-up messages. In other aspects of this disclosure, text appearing in a displayed pop-up display message may be converted to audio via a text-to-voice conversion process.

BRIEF DISCUSSION OF THE DRAWINGS

FIG. 1 provides a representation of a network arrangement having mobile devices, e.g., WiMAX-enabled devices operating with a WiMAX base station;

FIG. 2 provides a functional block diagram of an exemplary embodiment of a mobile device of this disclosure, e.g., a multimode CDMA/WiMAX device;

FIG. 3 provides an exemplary flowchart of a method of an embodiment of this disclosure;

Figure 7:
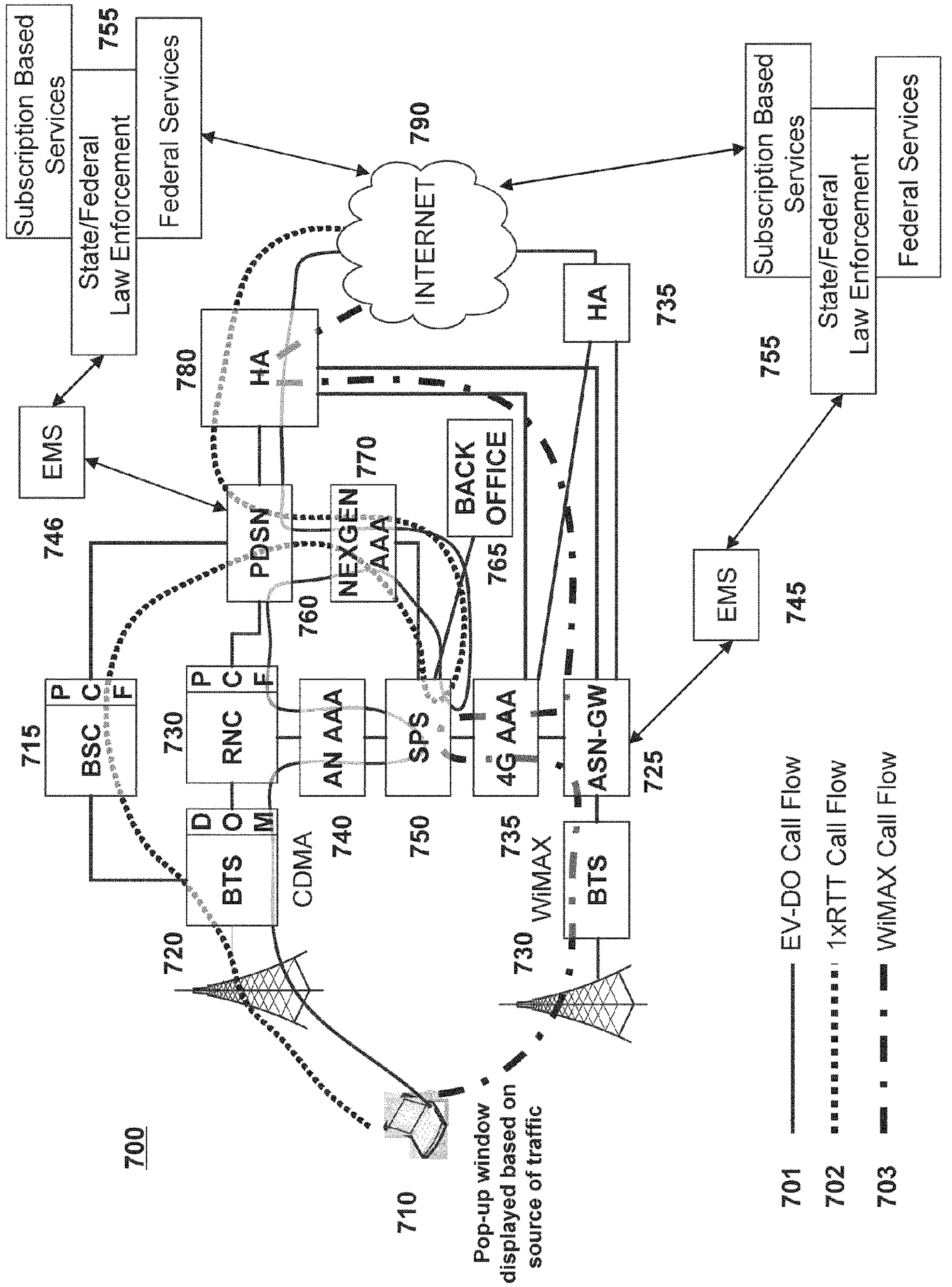
Figure 8:
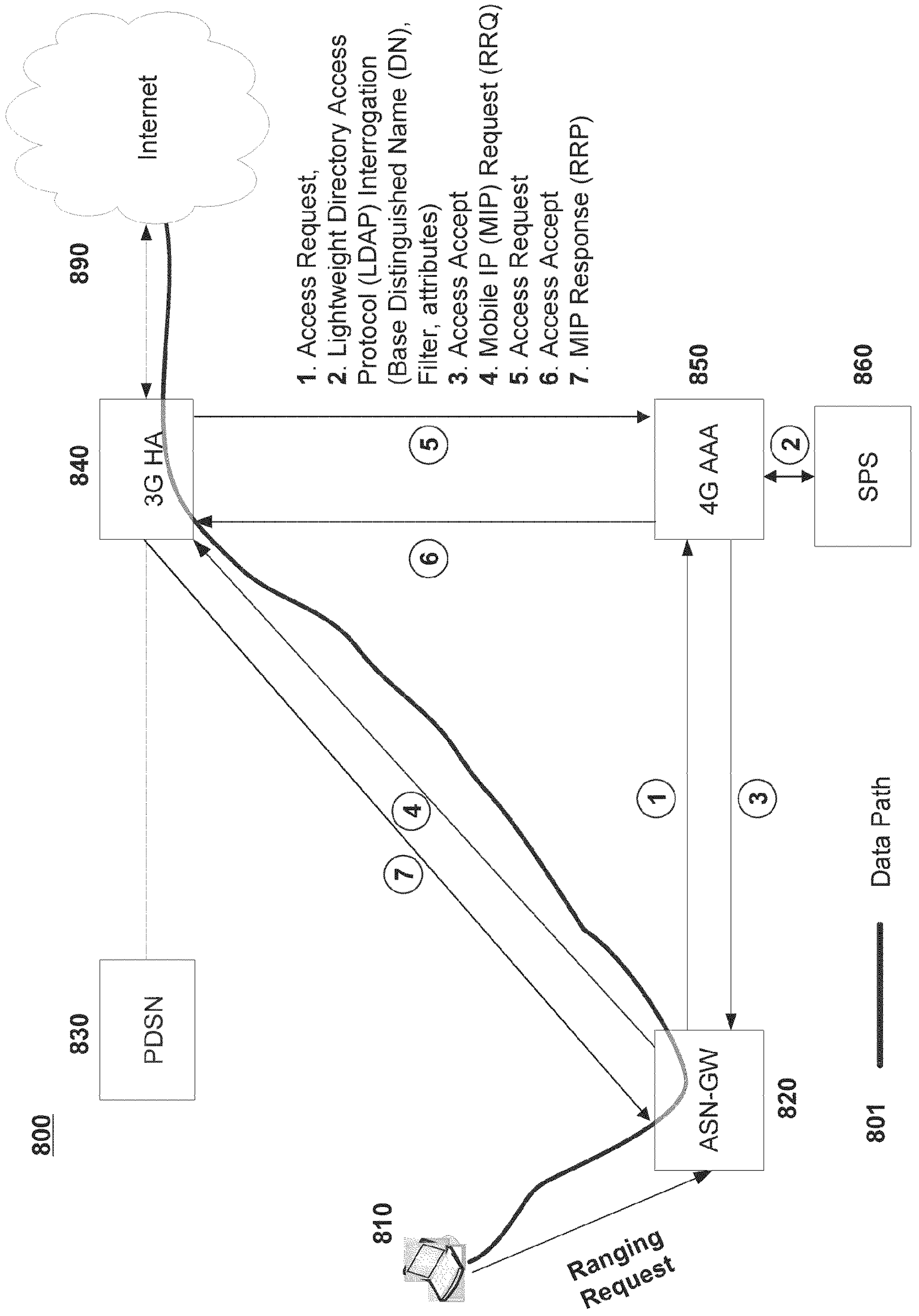
Figure 9:
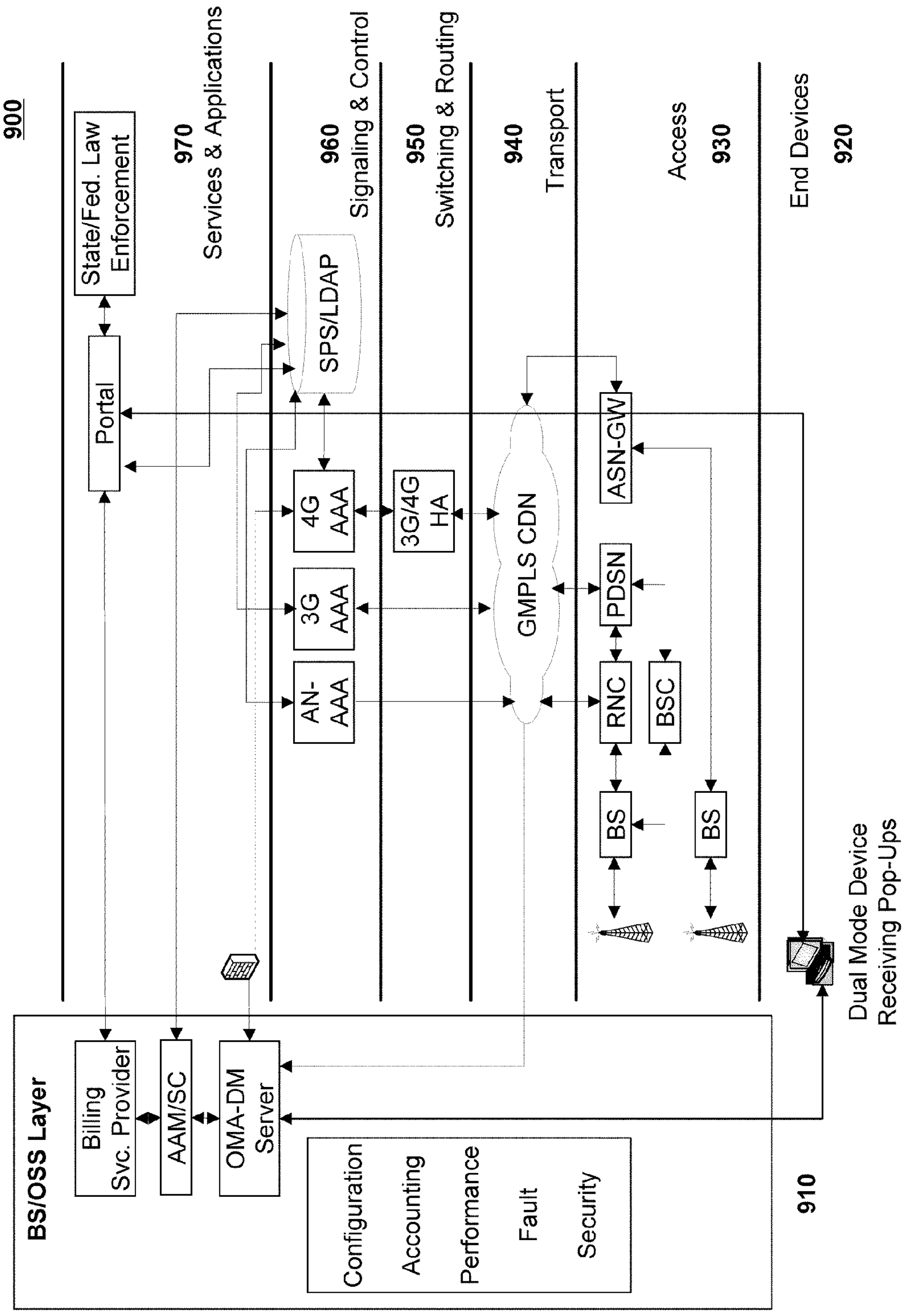

FIG. 7 schematically provides an exemplary system in which three different wireless technology call flow paths are illustrated for displaying a pop-up window on a dual-mode 3G/4G mobile device;

FIG. 8 illustrates data flow (dark line) for End-to-End call set up between a dual mode 3G/4G device and a 3G network; and FIG. 9 schematically illustrates an embodiment of an End-to-End Architecture to process data associated with the generation of pop up messages on a dual-mode device.

DETAILED DESCRIPTION

In the discussion of various embodiments and aspects of the system and method of this disclosure, examples of a processor may include any one or more of, for instance, a personal computer, portable computer, personal digital assistant (PDA), workstation, web-enabled mobile phone, WAP device, web-to-voice device, or other device. Further, examples of devices may include wireless phone handsets, smart phones, modems, laptop computers with embedded dual-mode functionality, and mobile Internet devices such as used for video streaming, including dual-mode CDMA/WiMAX devices, for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 1:
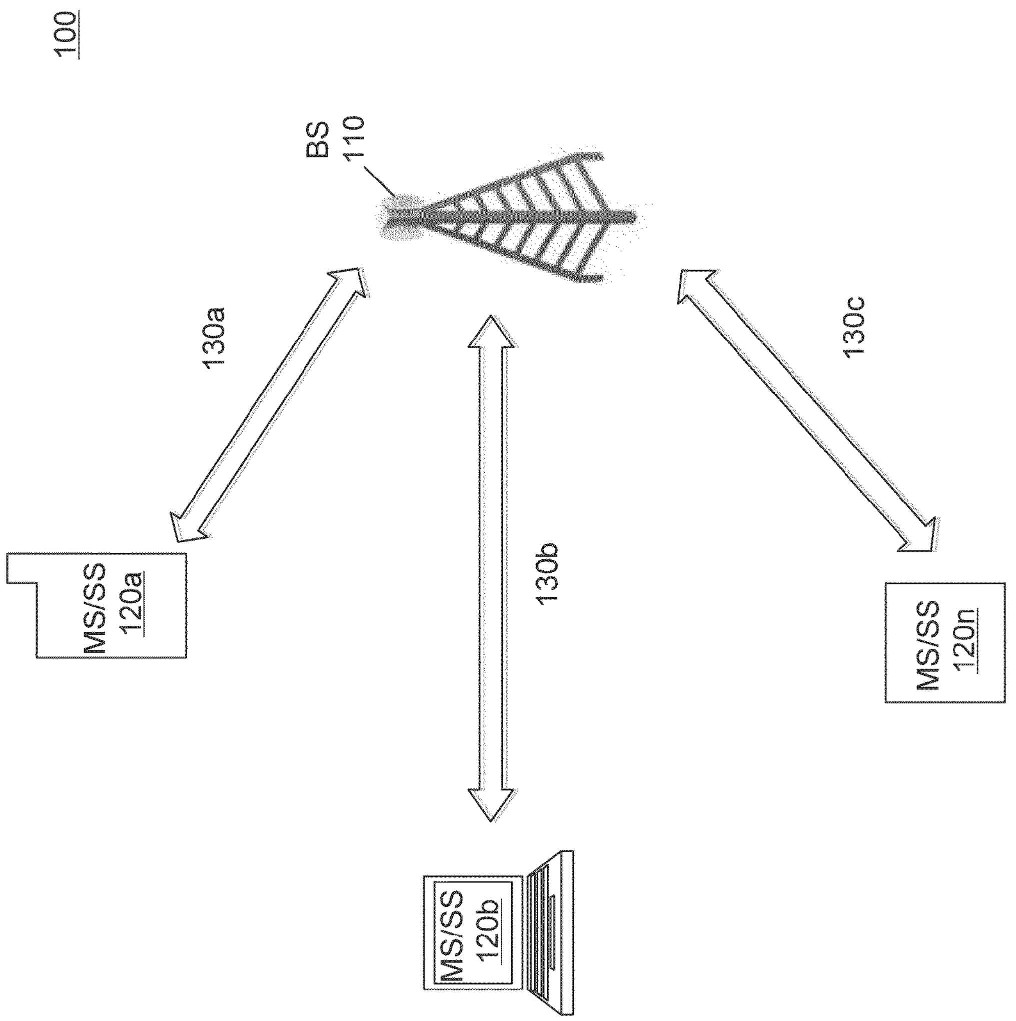

Turning now to FIG. 1, a mobile network implementation 100 is provided. In one exemplary embodiment, the IEEE 802.16 system architecture, for example, consists of two logical entities, the Base Station (BS) 110 and the Subscriber Station (SS) 120. Both BS 110 and MS 120 (e.g., 120*a*, 120*b*, 120*c*, generally referred to herein as MS 120) have instances of the IEEE 802.16 MAC and Physical Layer 1 (PHY), in addition to other support functions. However, specific functions performed by the MAC or PHY differ depending on whether it is a BS or SS, and the IEEE 802.16 standard defines the BS- and SS-specific behavior in detail.

In Point-to-Point (PtP) and Point-to-Multipoint (PMP) networks, BS 110 and MS 120 are in a master-slave relationship, where the SS must obey all medium access rules enforced by the BS. The mobile station (MS) defined in the IEEE 802.16 mobility extension (IEEE Std 802.16e) requires support for additional SS-specific functions such as mobility management, handoff, and power conservation. In this disclosure, the term "MS" is intended to not only include functionality of mobile user terminal equipment, but to also include fixed or relatively immobile terminal equipment SS. One of the basic differences between the BS and MS in a PMP network configuration is that BS 110, which acts as a centralized controller and a centralized distribution/aggregation point, has to coordinate transmissions to/from multiple MS 120*a*, 120*b*, 120*c* over communications channels 130*a*, 130*b*, and 130*c*, respectively, whereas MS 120*a* needs only to deal with BS 110 over communication channel 130*a*. All traffic originating from MS 120, including all MS-to-MS traffic (e.g., MS 120*a* to MS 120*b*) must go through BS 110. Therefore, in a typical IEEE 802.16 system, BS 110 has to have additional processing and buffering (i.e., memory) capability in comparison to a typical MS to support a reasonable number of MSs.

Figure 2:
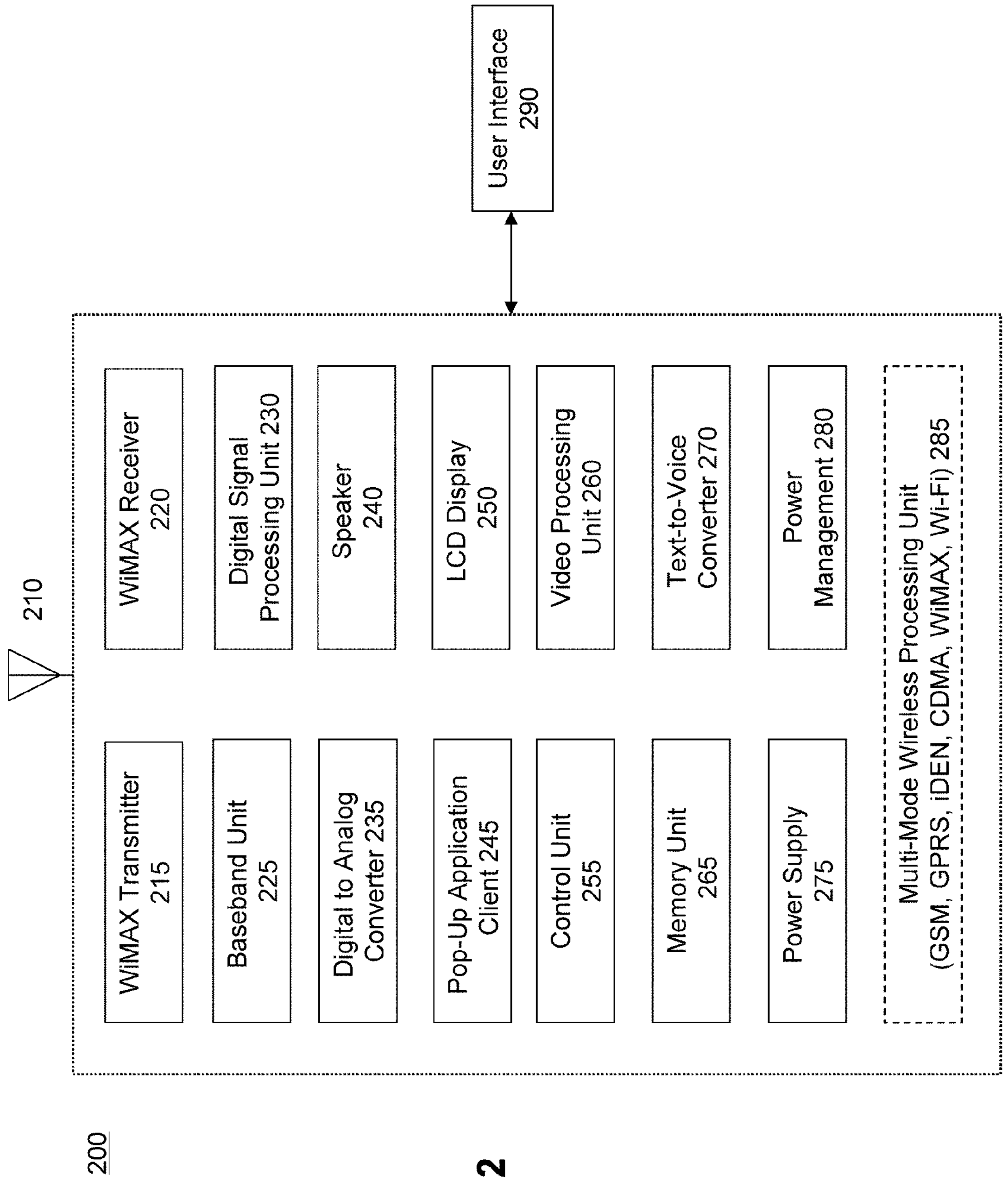

FIG. 2 provides a functional block diagram of exemplary mobile device 200, e.g., a handset device such as a smartphone. Mobile device 200 may be a multimode device, i.e., a device that is operable in different types of networks, e.g., a multimode CDMA and WiMAX device. Mobile device 200 may include antenna 210, transmitter 215 (e.g., a WiMAX transmitter), and receiver 220 (e.g., a WiMAX receiver). Other receivers may be included to accommodate any multi-mode functionality, or transmitter 215/receiver 220 may be configured to operate using different protocols and/or frequencies through software programming. Baseband unit 225 processes the received radio frequency (RF) signal and sends a baseband signal to appropriate known circuitry. Digital signal processing unit 230 provides necessary computer processing for mobile device 200, while digital to analog converter 235 changes voice signals to an analog format suitable for application to speaker 240. LCD display 250 may be used to display a variety of information such as program icons, e.g., mobile phone and/or e-mail programs, contact information, games, etc. Control unit 255 operates to control processor timing and memory access functions between the various functional modules in mobile station 200. Video processing unit 260 may be configured to process pictures and video for display and/or transmission over the network. Memory unit 265 may be configured to store various program instructions and/or data, and may include additional memory units, e.g., random access memory (RAM) and/or read-only memory (ROM). Text-to-voice converter 270 may include a processor configured with appropriate software to "read" text from one or more applications, and to output the text as synthesized speech in a known manner. Power supply 275 may be a battery source and/or solar power source, while power management module 280 may be configured to control the recharging of power supply 275 and/or to control power saving features, e.g., dimming of LCD display 250, or so-called graceful degradation of various services and/or functionality in response to reduced availability of battery power. Optional multi-mode wireless processing unit 285 may be configured to allow different modes of operation for mobile device 200. The dashed lines are used to represent the "optionality" of this particular functional module. User interface 290 may include a keyboard and/or touch screen interface that allows a user of mobile device 200 to provide conventional input, as well as to input preferences for displaying pop-up alerts.

Pop-up application client 245 may be one of a number of mobile application clients in mobile device 200. Pop-up application client 245 may be configured to process various alerts that the user of mobile device 200 has registered for, via e-mail, SMS, and/or RSS feeds. As an example, JavaScript may be used internal to pop-up application client 245 to generate various types of pop-up messages in accordance with various user preferences input through user interface 290. Other type of pop-up generation may be used. Although not relevant to the substance of the types of alerts displayed by embodiments of this disclosure, a JavaScript example follows which would operate to display one of a number of greetings, e.g., "Good morning", "Good afternoon", or Good evening", as well as greetings "Welcome to the world of Jscript", and "Just in case you were wondering, it's <date>."

Sample Pop-Up Script

```
<SCRIPT LANGUAGE="JavaScript">
<!--
    // These next lines of code execute when the script tag is parsed.
    var d = new Date( )
    var h = d.getHours( )
    if (h < 12)
```

-continued

Sample Pop-Up Script

```
        document.write("Good morning!")
    else
        if (h < 17)
            document.write("Good afternoon!")
        else
            document.write("Good evening!")
    document.write("<br><br>Welcome to the world of JScript. ")
    document.write("<br> Just in case you were wondering, it's " +
    d + ".")
//-->
</SCRIPT>
```

Alerts may be processed by pop-up application client 245 in "real-time", or may be delayed by user preference through user interface 290 to display at certain times or intervals. Further, pop-up application client 245 may be configured through user interface 290 to generate voice alerts instead of or in addition to a pop-up alert.

Figure 3:
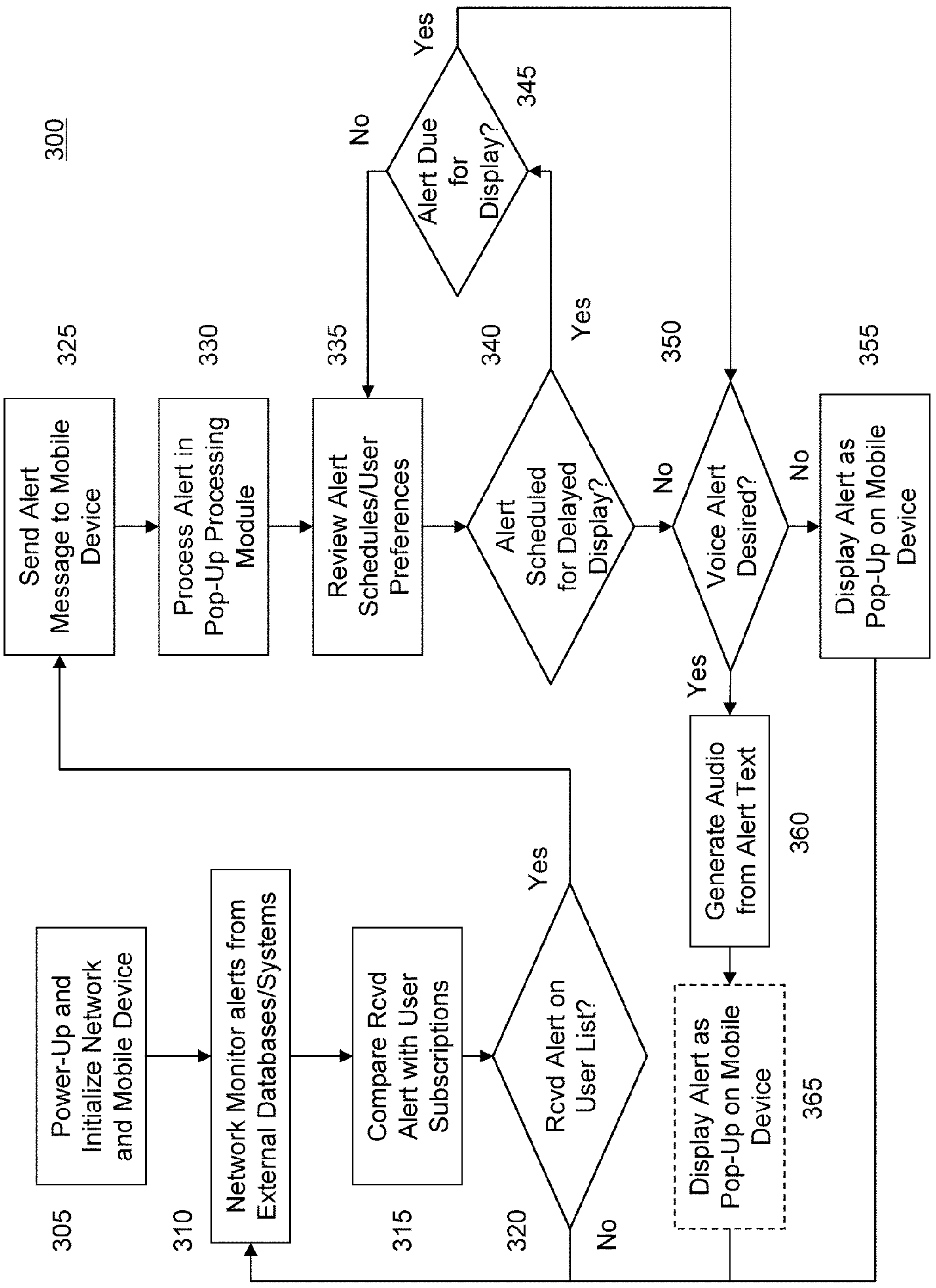

Turning now to FIG. 3, an exemplary flowchart of a pop-up alert generation process of an embodiment is provided. At step 305, if not already active, the data communications network (i.e., network backhaul, base station, and mobile station/device) is initialized. Network controller (not shown) monitors alerts and/or messages from external databases/systems 410 (see FIG. 4) at step 310. The received alerts are compared with a user/subscriber's subscription services at step 315 to determine what alerts/messages should be forwarded to the mobile device/user. At step 320, if a received alert is on the user's list of subscribed services/alerts, the alert message is sent to the mobile device at step 325. If the received alert is not on the user's list, alert processing returns to continue monitoring alerts at step 310. After step 325, the mobile device processes the received alert at step 330, e.g., using pop-up management application client 245. Pop-up management application client 245 reviews any user preferences, e.g., alert scheduling preferences (i.e., if not to be displayed in "real-time"), and/or display colors, fonts, audio, etc. at step 335 and, determines whether delayed display is enabled at step 340. If delayed display is enabled, step 345 determines whether the alert is due for display. If "NO", then processing returns to step 335. If "YES", step 350 determines whether a user preference for the particular type of alert includes a voice alert. If "NO", the alert is displayed as a pop-up alert at step 355. If "YES", then text-to-voice conversion is conducted at step 360. The dashed lines at step 365 are used to indicate that a pop-up alert may also be displayed in addition to the voice alert. Processing returns to step 310 from either pop-up display step 355 or 365.

A non-exhaustive and non-limiting list of existing alerts and their current mode(s) of operation and how such alerts can be adopted to the inventive concept of this disclosure is provided below.

Crime Reports email system: Once police confirm a crime on the scene, police agencies may follow up with a thorough email disclosing the time, location and type of crime as a part of a crime-information service. The type of crime may include illegal activity in subscribers' neighborhoods. Police departments often contract with Internet-based crime-mapping services such as CrimeMapping.com, CrimeReports.com and EveryBlock.com. These types of services receive live feeds from police record-keeping systems and automatically post the data on their sites. Law enforcement officials use such websites to help change citizen's behavior toward crime, and to encourage dialogue with communities so that more people might offer tip or leads. Some of the sites may have crime-report web logs ("blogs") that examine activity in different locales. To track crime report trends, consumers may type an address or city into a search query on the website. Small icons representing type of crime, for example, auto theft or aggravated assault, appear on a map. Users can set the parameters for a search, including specific time period. Law enforcement can add comments or ask the public for more information about an incident. Consumers who use these services say that they feel safer. Other consumers are integrating these types of services into their work place such as property management organizations, for example. They can use such websites to keep tabs on crime around apartments units, townhouses, and single-family properties that they manage. When a crime appears on a site, real-estate agents may send out notifications to civic groups and homeowner associations at some of the properties. That helps prevent more break-ins, which leads to lower maintenance costs at properties.

Amber-Alert: When a child abduction has occurred, create an Amber Alert Notification message screen on the handset/embedded device screen. The missing person must first be entered into the federal National Crime Information Center (NCIC) system before entering the information on the Amber Alert screen. The NCIC is a computerized index of criminal justice information (i.e. —criminal record history information, fugitives, stolen properties, missing persons). It is available to Federal, state, and local law enforcement and other criminal justice agencies and is operational 24 hours a day, 365 days a year. After the information is entered on the Amber Alert Notification screen, the information is immediately transmitted to all law enforcement agencies in the state that receive "Be On the Look Out" (BOLO) messages. Information provided in the message includes victim data such as name, race, sex, age, height, weight, hair and eye color; and if available, suspect information such as name, race, sex, age, vehicle description and license plate number. Immediately alerting state and local law enforcement agencies reduces the opportunity for the victim to be transported out of their local area, and increases the chance of successfully returning the victim to their loved ones and apprehending the suspect. The purpose for maintaining the NCIC system is to provide a computerized database for ready access by a criminal justice agency making an inquiry and for prompt disclosure of information in the system from other criminal justice agencies about crimes and criminals. This information assists authorized agencies in criminal justice and related law enforcement objectives, such as apprehending fugitives, locating missing persons, locating and returning stolen property, as well as in the protection of the law enforcement officers encountering the individuals described in the system. All records in NCIC are protected from unauthorized access through appropriate administrative, physical, and technical safeguards. These safeguards include restricting access to those with a need to know to perform their official duties, and using locks, alarm devices, passwords, and/or encrypting data communications. Data contained in NCIC is provided by the FBI, federal, state, local and foreign criminal justice agencies, and authorized courts.

Edline system: The Edline® system is used by some high schools, when a child is getting poor grades, it sends an "alarm" to their parents. The Edline system used by the Montgomery County, Maryland Public Schools emails each poor grade to parents as soon the grade is entered in the Edline system. This is what is known as the "data-driven" movement in U.S education". Using Handheld/embedded devices, for example, teachers can retrieve detailed snapshots of each student's progress on tests and other measures of proficiency.

Figure 4:
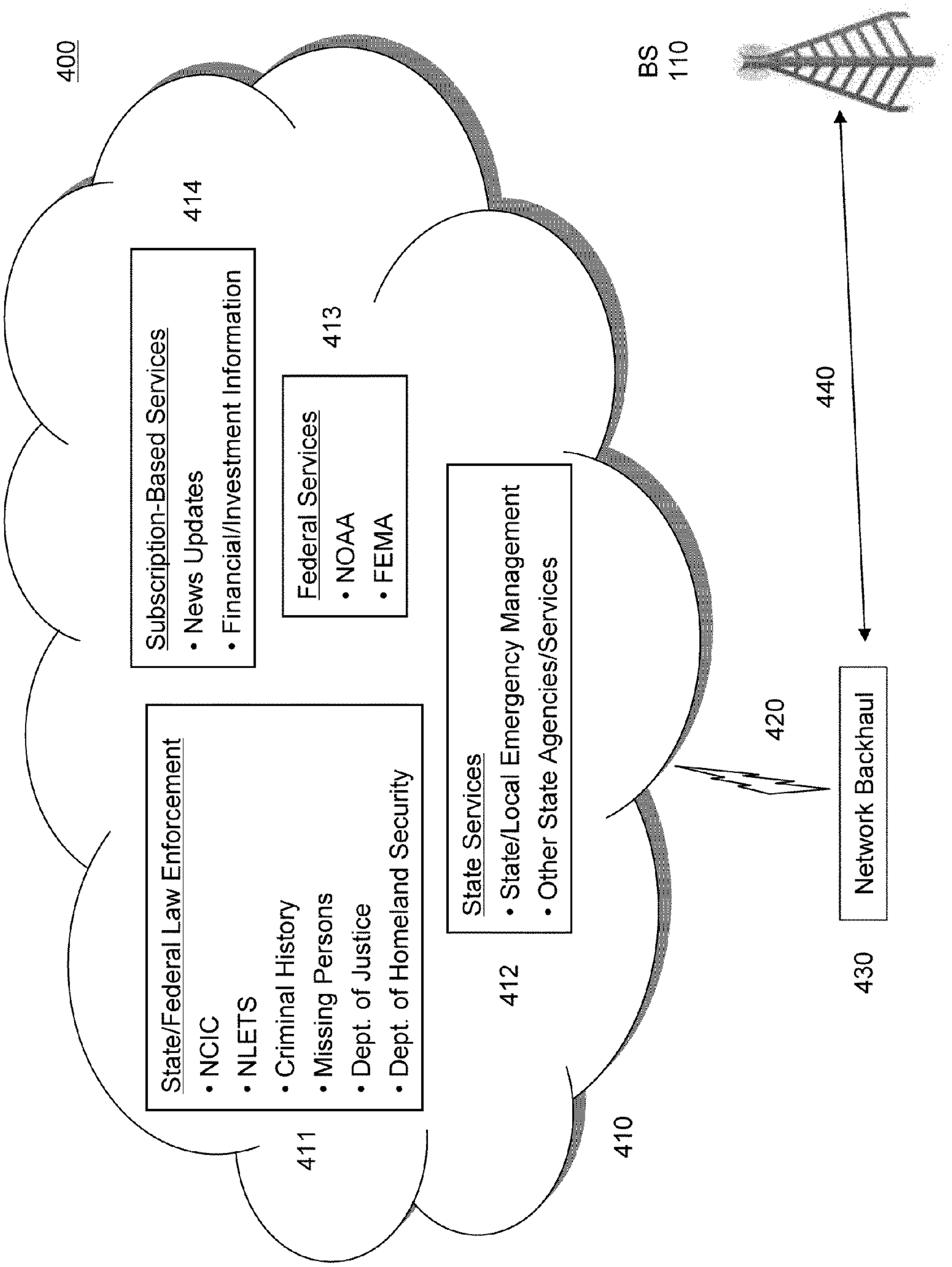
FIG. 4 depicts a number of exemplary systems and databases which may be interfaced with the mobile device of FIG. 2 via a data communications network.

FIG. 4 depicts a variety of databases and/or services 410 in system 400. Databases/services 410 include, inter alia, State/Federal Law Enforcement databases 411, State Service databases 412, Federal Services 413, and Subscription-Based Services 414, e.g., the Wall Street Journal®, the New York Times®, and Investor's Business Daily®, for example. Systems 410 may be connected to private or public networks (e.g., the Internet) via servers or web servers (not shown). Mobile communications networks generally include so-called "backhaul" systems that connect the wireless network to other systems, e.g., the Internet. Network backhaul 430 may be connected to services 410 via connection 420 (e.g., the Internet). Network backhaul 430 may be connected to BS 110 via communications path 440. BS 110 then may communicate the data received from network backhaul 430 and services 410 to MS 120.

Figure 5B:
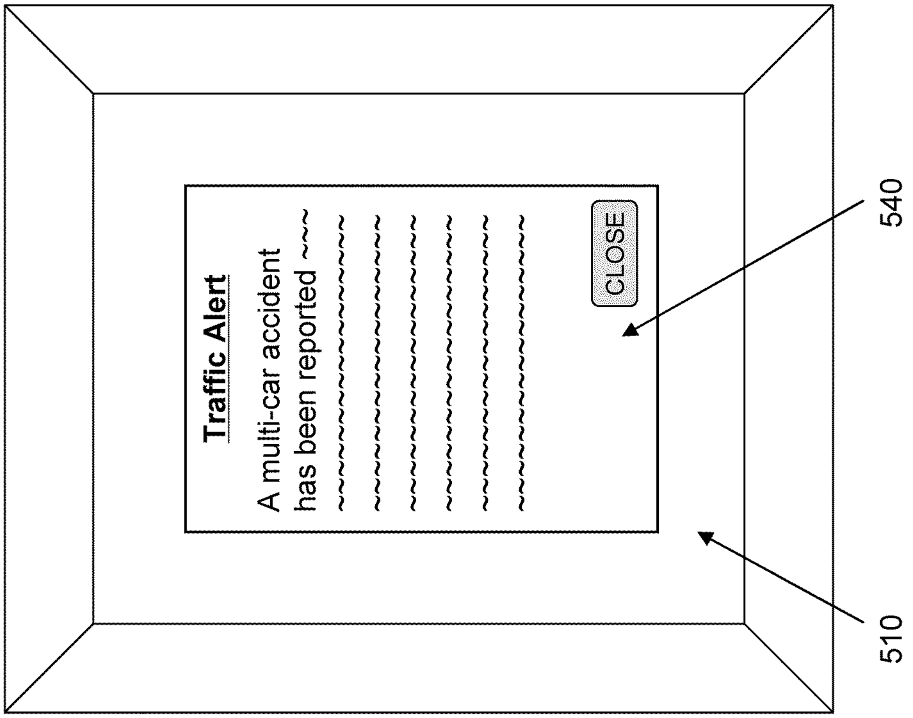
FIGS. 5A and 5B depict simplified pop-up message alerts on a handheld device display.
Figure 5A:
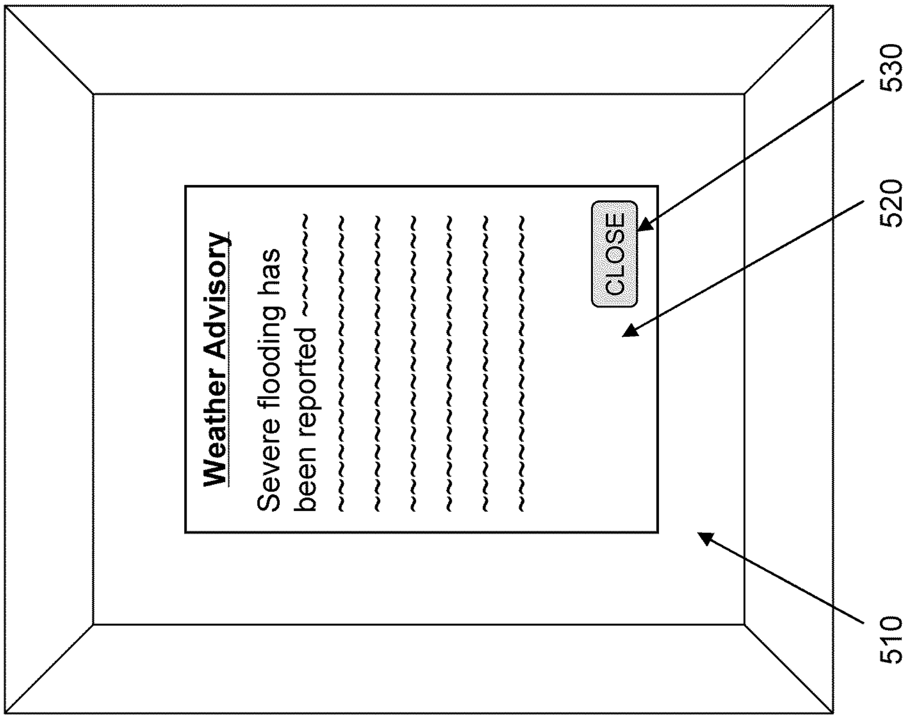

FIGS. 5A and 5B depict simplified representations of display 510 displaying pop-up alert 520 (FIG. 5A) and pop-up alert 540 (FIG. 5B). Radio button 530 may be depressed by the use of a touch screen depression and/or cursor/keyboard actuation to close pop-up 520.

Figure 6:
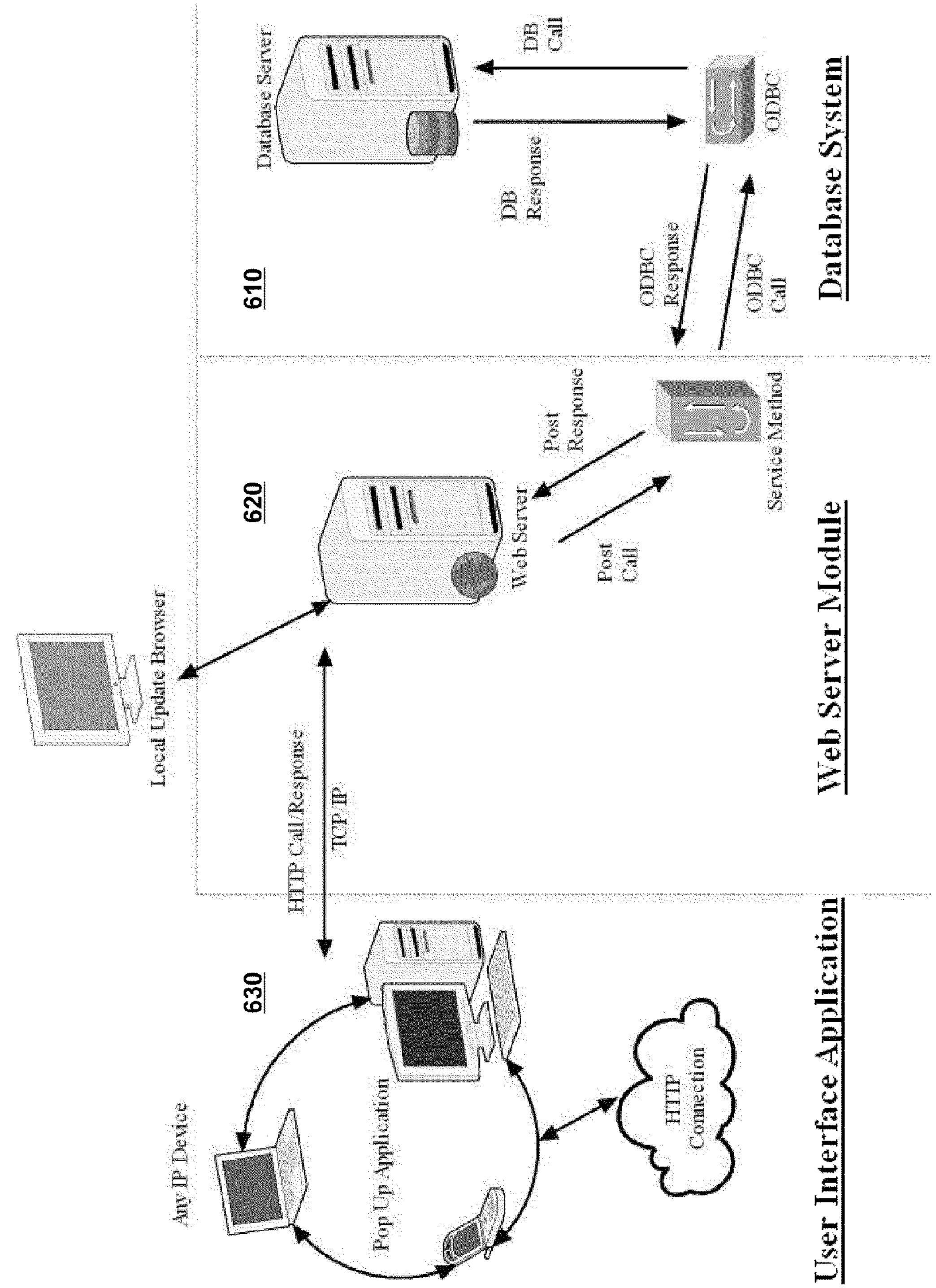
FIG. 6 depict a system architecture of an embodiment of this disclosure.

FIG. 6 depicts exemplary details of an "end-to-end" system of an embodiment of this disclosure. Database system 610 represents one of the systems represented by systems 410 in FIG. 4. Typically, database system 610 includes a database server which is operated in accordance with the open database connectivity (ODBC) standard. Other types of databases may be used, e.g., a structured query language (SQL). Web server module 620 communicates with database system 610 via an ODBC call/response exchange. Web server module 620 then exchanges information with user interface application 630 using, for example, HTTP Call/Response. The TCP/IP protocol may also be used in this exchange of information. User interface application 630 receives the response via an HTTP connection, for example. User application interface 630 may be a mobile or stationary device capable of running Internet Protocol (IP) applications, e.g., a laptop computer, desktop computer, or handheld device configured to run a pop-up alert application.

FIG. 7 schematically illustrates exemplary system 700 in which three different wireless technology call flow paths, e.g., EV-DO call flow 701, 1xRTT call flow 702, and WiMAX call flow 703 are illustrated for displaying a pop-up window on a dual- or multi-mode 3G/4G mobile device. Single carrier Radio Transmission Technology 1xRTT is a 3G wireless technology based on CDMA technology and having the capability of providing ISDN-like speeds of up to 144 Kbps.

Dual or multi-mode device 710, while in EV-DO mode 701, communicates between base transceiver system (BTS) 720, radio network controller with packet control function (RNC/PCF) 730 which maintains the connection state between PDSN 760 and RNC 730, to Access Network Authentication, Authorization, Accounting server (AN AAA) 740, to subscriber provisioning system (SPS) 750 that prepares and equips the network so that it can provide services to its users through back office 765. Packet data servicing node (PDSN) 760 is a component of a CDMA2000 mobile network that acts as the connection point between the Radio Access and IP networks and is responsible for managing point-to-point protocol sessions between the mobile provider's core IP network and multi-mode device 710. PDSN 760 connects to home agent (HA) 780, which is a router on a mobile node's home network which tunnels datagrams to and from multi-mode device 710 from Internet 790. HA 780 maintains current location (IP address) information for the mobile node.

Dual or multi-mode device 710, while in 1xRTT mode 702, communicates between BTS 720, to base station controller with packet control function (BSC/PCF) 715, which maintains the connection state between PDSN 760 and BSC 715, to access next generation AAA 770 (NEXGEN AAA). SPS 750 is provisioned through back office 765. PDSN 760 connects to HA 780 and to Internet 790.

Dual or multi-mode device 710, while in WiMAX mode 703, communicates between WiMAX BTS 730, Access Service Network Gateway (ASN-GW) 725, 4G AAA 735 to SPS 750, which is provisioned by back office 765. Then, 4G AAA 735 connects via either HA 780 or HA to Internet 790.

Element management systems (EMS) 745, 746 generally include systems and applications that manage network elements on the network element management layer. For example, subscription-based services, state/federal law enforcement, and federal services 755 (which may be connected to Internet 790) may be provided to ASN-GW 725 and PDSN 760 via EMS 745 and 746, respectively.

FIG. 8 illustrates data path (dark line) 801 for End-to-End call set up between dual or multi-mode 3G/4G device 810 and a 3G network. Device 801 transmits a ranging request to ASN-GW 820, which transmits access request 1 to 4G AAA 850, which then transmits LDAP interrogation 2, and transmits access accept 3 to ASN-GW 820. ASN-GW 820 sends mobile IP request (MIP RRQ) 4 to 3G HA 840 which, in turn, send access request 5 to 4G AAA 850, which then returns access accept 6 to 3G HA 840. 3G HA 840 sends mobile IP response (MIP RRP) 7 to ASN-GW 820, thus establishing an IP address for device 810.

FIG. 9 schematically illustrates an embodiment of End-to-End Architecture 900 to process data associated with the generation of pop up messages on a dual-mode device, and will be described in terms of the functional impact on each layer in the 4G and 3G networks.

Billing Support/Operating Support System (BS/OSS) 910 provides configuration, accounting, performance, fault detection, and security services for connected devices. The billing service provider may be the commercially available "Amdocs" service, which provides telephone billing services. Accounting Authorization Media System Controller (AAM/SC) is used to provide a framework for controlling access to computer network resources, enforcing policies, auditing usage, and providing the information necessary to bill for services. These combined processes are considered important for effective network management and security. Open Mobile Alliance Device Management module (OMA-DM) is designed for management of small mobile devices such as mobile phones, PDAs, palm top computers, and other mobile devices. Device management is intended to support the following typical uses: Provisioning—Configuration of the device (including first time use), enabling and disabling features; Configuration of Device—Allow changes to settings and parameters of the device; Software Upgrades—Provide for new software and/or bug fixes to be loaded on the device, including applications and system software; and Fault Management—Report errors from the device, query about status of device.

In end device layer 920, a 4G/3G device (known as a dual or multi-mode device) has supporting software installed, e.g., in the form of a client, to support activation of pop-up windows. In access layer 930, ASN-GW may route traffic based on the originating IP address (i.e., State/Federal Law Enforcement, Subscription-Based Services, Federal Services, State Services, etc.). In addition, ASN-GW may be configured to route data traffic to a designated 4G AAA (bottom BS) and a 3G HA (upper BS), respectively.

In transport layer 940, underlying routing and switching may be configured in the Generalized Multiprotocol Label Switching Connectivity Data Network (GMPLS-CDN) to transport packets between the ASN-GW and 3G RNC and PDSN in access layer 930, and the 4G AAA, 3G AAA, and access network (AN) AAA in signaling and control layer 960, and 3G/4G HA in switching and routing layer 950. GMPLS enhances multiprotocol label switching (MPLS) architecture by the complete separation of the control and data planes of various networking layers. GMPLS enables a seamless interconnection and convergence of new and legacy networks by allowing end-to-end provisioning, control and traffic engineering even when the start and the end nodes belong to heterogeneous networks.

In Switching & Routing Layer 950, besides continued support of existing 3G services, the 3G/4G HA will be capable of establishing WiMAX MIP sessions for dual-mode devices to access 3G services. Such a 3G/4G HA may also be referred to as a "Hybrid HA". A Firewall may be configured to protect the 3G and 4G network border.

Signaling & Control Layer 960 provides 4G AAA which will identify, authenticate and authorize dual-mode devices. 4G AAA and SPS/LDAP will collaborate to support dual-mode network accesses. Further, SPS will be provisioned by back office system for dual-mode devices support. The 4G AAA server may also assign the 3G/4G HA for dual mode devices.

Services & Application Layer 970 is configured such that the WiMAX network will prevent unauthorized dual-mode devices from subscribing to or receiving services from the WiMAX portal.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

LISTING OF ACRONYMS

| Acronym | Definition |
|---|---|
| AAA | Authentication, Authorization, Accounting |
| AAM/SC | Accounting Authorization Media/System Controller |
| AN | Access Network |
| ASN-GW | Access Service Network Gateway |
| BS | Base Station |
| BSC | Base Station Controller |
| BS/OSS | Billing Support/Operating Support System |
| BTS | Base Transceiver Station |
| CDMA | Code Division Multiple Access |
| CDN | Connectivity Data Network |
| DOM | Data Optimized Module |
| EAP-TLS | Extensible Authentication Protocol-Transport Layer Security |
| EV-DO | Evolution, Data Only or Evolution, Data Optimized |
| EMS | Element Management System |
| FEMA | Federal Emergency Management Agency |
| GMPLS | Generalized Multiprotocol Label Switching |
| GPRS | General Packet Radio Service |
| GSM | Global System for Mobile communication |
| HA | Home Agent |
| HTTP | Hypertext Transfer Protocol |

-continued

| Acronym | Definition |
|---|---|
| iDEN | Integrated Digital Enhanced Network |
| IP | Internet Protocol |
| LDAP | Lightweight Directory Access Protocol |
| MAC-ID | Media Access Control Identification |
| MIP | Mobile IP |
| MS | Mobile Station |
| NAI | Network Access Identifier |
| NCIC | National Crime Information Center |
| NEXGEN | Next Generation |
| NLETS | National Law Enforcement Telecommunications System |
| NOAA | National Oceanic and Atmospheric Administration |
| OBDC | Microsoft Open Database Connectivity |
| OMA-DM | Open Mobile Alliance Device Management |
| PCF | Packet Control Function |
| PDSN | Packet Data Servicing Node |
| RADIUS | Remote Authentication Dial in User Service |
| RNC | Radio Network Controller |
| RRP | Response |
| RRQ | Request |
| SPS | Subscriber Provisioning System |
| SS | Subscriber Station |
| TCP | Transport Control Protocol |
| Wi-Fi ® | Trademark of Wi-Fi Alliance for IEEE 802.11 standard-certified products for wireless Local Area Networks |
| WiMAX | Worldwide Interoperability for Microwave Access |
| WMAN | Wireless Metropolitan Area Network |
| 1xRTT | Single carrier (1x) Radio Transmission Technology. |
| 3G | Third generation wireless |
| 4G | Fourth generation wireless |

What is claimed is:

1. A method of receiving alerts through a communications network at a mobile device registered in the network, said mobile device comprising a pop-up management module, a display, a user interface and a communications interface between the mobile device and one or more database systems located outside the network, the method comprising:

selectively choosing, through the user interface, to receive one or more message types generated by the one or more database systems at the mobile device, and selectively configuring a user preference for at least one of the one or more message types, and processing by said pop-up management module a message of the at least one of the one or more message types received at the mobile device from a network server based on the selectively-configured user preference related to said received message, and displaying the processed message on the display as a pop-up message, said processing comprising determining whether delayed display is enabled for the message type of said received message, determining whether a voice alert is associated with the message type of said received message, responsive to a determination by the pop-up management module that a voice alert is associated with the message type of said received message, converting text in the pop-up message to audio using a text-to-voice converter, and translating a native format of the message type of said received message into the pop-up message.

2. The method of claim 1, wherein the one or more message types comprise a plurality of message types selected from the group consisting of a missing child alert, a weather alert, a traffic alert, a natural disaster alert, and a governmental alert.

3. The method of claim 1, wherein the one or more message types comprise one or more governmental alerts selected from the group consisting of a crime alert, a terrorism alert, and a disaster alert.

4. The method of claim 1, wherein the one or more database systems comprise one or more governmental databases selected from the group consisting of a law enforcement database, a missing persons database, and a weather database.

5. The method of claim 1, wherein the one or more database systems comprise one or more subscription-based database systems.

6. The method of claim 5, wherein the one or more subscription-based databases comprise a news database system or a financial investment database system.

7. The method of claim 1, wherein the mobile device is a WiMAX-enabled device and the network is a WiMAX network, wherein the communications interface between the WiMAX-enabled device and one or more database systems located outside the WiMAX network is implemented using TCP/IP.

8. The method of claim 1, wherein the pop-up management module is implemented as a client application configured to operate in a client-server relationship with the one or more database systems.

9. The method of claim 1, wherein the user preference comprises one or more of an audio alert and a pop-up duration for each of the one or more message types.

10. The method of claim 1, wherein the user preference comprises a non-real time display schedule for each of the one or more message types.

11. The method of claim 1, wherein the native format includes e-mail, SMS, and RSS feed.

12. A system for providing alerts to a user through a data network, the system comprising:

a mobile device registered in the network, said mobile device comprising a processor, a memory device, a transceiver configured to selectively transmit and receive data over the network, a user interface, and a display, wherein the processor is configured to control a pop-up management module; and a communications interface between the mobile device and one or more database systems located outside the network;

wherein the user interface of the mobile device is configured to allow the user to selectively choose to receive one or more message types generated by the one or more database systems at the mobile device, and selectively configure a user preference for at least one of the one or more message types, wherein the mobile device is configured to receive a message of the at least one of said one or more message types via the network, and wherein said pop-up management module is configured to process said received message based on the selectively-configured user preference related to said received message, and display the processed message on the display as a pop-up message, wherein to process said received message, said pop-up management module is configured to determine whether delayed display is enabled for the message type of said received message, determine whether a voice alert is associated with the message type of said received message, responsive to a determination by said pop-up management module that a voice alert is associated with the message type of said received message, using a text-to-voice converter configured to convert text in the pop-up message to audio, and translate a native format of the message type of said received message into the pop-up message.

13. The system of claim 12, wherein the native format includes e-mail, SMS, and RSS feed.

14. The system of claim 12, wherein the one or more message types comprise a plurality of message types selected from the group consisting of a missing child alert, a weather alert, a traffic alert, a natural disaster alert, and a governmental alert.

15. The system of claim 12, wherein the one or more message types comprise one or more governmental alerts selected from the group consisting of a crime alert, a terrorism alert, and a disaster alert.

16. The system of claim 12, wherein the one or more database systems comprise one or more governmental databases selected from the group consisting of a law enforcement database, a missing persons database, and a weather database.

17. The system of claim 12, wherein the one or more database systems comprise one or more subscription-based database systems.

18. The system of claim 17, wherein the one or more subscription-based databases comprise a news database system or a financial investment database system.

19. The system of claim 12, wherein the mobile device is a WiMAX-enable device and the data network is a WiMAX network, wherein the communications interface between the WiMAX-enabled device and one or more database systems located outside the WiMAX network is implemented using TCP/IP.

20. The system of claim 12, wherein the pop-up management module is implemented as a client application configured to operate in a client-server relationship with the one or more database systems.

21. The system of claim 12, wherein the user preference comprises one or more of an audio alert and a pop-up duration for each of the one or more message types.

22. The system of claim 12, wherein the user preference comprises a non-real time display schedule for each of the one or more message types.

23. A non-transitory computer-readable medium comprising computer readable code embodied thereon which, when executed by a processor arranged in a WiMAX-enabled device comprising a display, a pop-up management module, and a user interface, causes the processor to carry out operations comprising:

receiving a message of at least one of one or more alert message types over a communications interface between the WiMAX-enabled device and one or more database systems located outside a WiMAX network;

allowing the user to selectively configure, at the user interface of the WiMAX-enabled device, a user preference for the at least one of the one or more alert message types;

processing the received message at the pop-up management module based on the selectively-configured user preference related to the received message, said processing comprising determining whether delayed display is enabled for the message type of the received message, determining whether a voice alert is associated with the message type of the received message, responsive to a determination by the pop-up management module that a voice alert is associated with the message type of the received message, converting text in the pop-up message to audio via a text-to-voice conversion process, and translating a native format of the message type of the received message into a pop-up message; and displaying said message processed by said pop-up management module on the display as the pop-up message.

24. The computer-readable medium of claim 23, wherein the user preference comprises a non-real time display schedule for each of the one or more message types.

25. The computer-readable medium of claim 23, wherein the native format includes e-mail, SMS, and RSS feed.

26. The computer-readable medium of claim 23, wherein the communications interface between the WiMAX-enabled device and one or more database systems located outside the WiMAX network is implemented using TCP/IP.

27. The computer-readable medium of claim 23, wherein the pop-up management module is implemented as a client application configured to operate in a client-server relationship with the one or more database systems.

28. The computer-readable medium of claim 23, wherein the user preference comprises one or more of an audio alert and a pop-up duration for each of the one or more message types.

* * * * *